Dec. 2, 1969 J. FINKLE 3,482,104

SYSTEM FOR TELEVISING RADIANT ENERGY IMAGES EMPLOYING IMAGE TRANSDUCER DEVICE WITH RADIANT ENERGY IMAGE RESPONSIVE PHOTOCATHODE

Filed May 24, 1965 3 Sheets-Sheet 1

INVENTOR.

BY Jack Finkle

Dec. 2, 1969 J. FINKLE 3,482,104

SYSTEM FOR TELEVISING RADIANT ENERGY IMAGES EMPLOYING IMAGE TRANSDUCER DEVICE WITH RADIANT ENERGY IMAGE RESPONSIVE PHOTOCATHODE

Filed May 24, 1965 3 Sheets-Sheet 2

INVENTOR.

BY Jack Finkle

Dec. 2, 1969 J. FINKLE 3,482,104

SYSTEM FOR TELEVISING RADIANT ENERGY IMAGES EMPLOYING
IMAGE TRANSDUCER DEVICE WITH RADIANT ENERGY
IMAGE RESPONSIVE PHOTOCATHODE

Filed May 24, 1965 3 Sheets-Sheet 3

INVENTOR

Jack Finkle

United States Patent Office 3,482,104

Patented Dec. 2, 1969

3,482,104

SYSTEM FOR TELEVISING RADIANT ENERGY IMAGES EMPLOYING IMAGE TRANSDUCER DEVICE WITH RADIANT ENERGY IMAGE RESPONSIVE PHOTOCATHODE

Jack Finkle, 918 E. 14th St., Brooklyn, N.Y. 11230

Filed May 24, 1965, Ser. No. 459,529

Int. Cl. H01j *31/50*

U.S. Cl. 250—213 5 Claims

ABSTRACT OF THE DISCLOSURE

An image transducer having a surface with a multiplicity of depressions of substantially paraboloidal shape, a light reflecting layer lining the depression and a fluorescent mass excitable by X-ray filling the depressions.

This invention relates to an improved method and novel transducer tube for conversion and intensification of radiant images produced by X-rays or other ionizing radiation. More particularly, this device refers to an improved method and electronic tube for image intensification employing a novel photocathode target for image intensification. It also makes use of the principles of electron optics as employed in the television art for televising images formed by the impingement of X-rays (also known as roentgen rays) or gamma radiation on a fluorescent and reactive layer for purposes of reproduction and image intensification. It also makes use of a storage target for image storage purposes.

It is desirable to be able to store a fluoroscopic image corresponding to an X-ray image mosaic signal and to release this stored image at a later time. In addition, it is desirable to use a smaller X-ray intensity in order to be able to achieve the brightest possible image on a fluoroscopic screen or later on a viewing television screen, since the deleterious effects of X-rays on all living organisms is well known. It is also desirable to improve the light-emission structure of fluorescent surfaces since heretofore these were very deficient in the prior art. The novel feature of this invention is the use of a new type of photocathode target 2 in FIG. 1 of the tube 35 employing crenulated or indented depressions or paraboloid shape to serve both as a light emitter and as a mirror for activation of the image amplifier structure 30 of plate one (1).

A primary object of this invention is to provide a method for increasing the brightness of the received image produced by X-rays or gamma rays or particulate radiation on a fluorescent surface without substantially increasing the quantity of X-radiation to which the object being X-rayed is exposed.

A general object is to produce a device for reproducing sharper and more intensified images, the said image being reproduced in proper spacial relationship to the body being investigated, and in a manner that will enable the operator to store the image or reproduce the image by photographic, or television means.

Still another object is to provide apparatus for televising images formed by X-rays such that the original image is reproduced with increased light intensity.

A further object of this invention is to provide a pick-up screen of novel construction as a photocathode so as to increase the definition of the radiant image mosaic being reproduced by the image amplifier section of the apparatus and further to intensify the X-ray image mosaic received upon said photocathode screen target.

Images of objects may be formed in two basically different ways; the picture as a whole may be projected simultaneously on the recording surface, as typified by the effect produced by the photographic camera, or it may be formed by the sequential recording of its individual elements, as an artist does with a paint brush. Practically all optical instruments utilize the first method of image reproduction. Television and picture facsimile systems, however, analyze the picture to be transmitted into a large number of minute picture elements, successive signals derived from adjacent elements and proportional to their brightness, serving to control the intensity distribution in the resynthesized image on the viewing tube, recorder paper or film. In this invention it is proposed to employ the latter method, to provide means for translating a radiographic image into an electronic image which can subsequently be reconverted into an optical image for subsequent storage or for later viewing as desired. It will also serve as an advantage to the viewer to be able to continue to view the reproduced image after the initial X-ray forming image machine (or other source of input energy to the fluorsecent mosaic screen) has ceased to operate.

Scanning of the electron image in television tubes has been achieved by point-by-point scanning utilizing either a photo-cathode or cathode-ray beam from a scanning gun with suitable accompanying circuits and employing suitable focussing and deflection elements for controlling the electron beam. In this invention it is proposed to employ similar means of electron manipulation and scanning as is known in the electron art. In FIG. 1 the scanning beam is shown being emitted from the elements 20 and is represented by the cathode ray beam 18 scanning the target rear surface 15. The return aspect of the beam is made to traverse an additional multiplier section 23 to further amplify the electron image by secondary electron emission.

In the drawings:

FIGURE 1 is a schematic illustration partially in cross-section of a laminated cell image converter and intensifier tube employing a radiant energy responsive photocathode pursuant to this invention combined with an image intensifier structure, a photo-emissive electrode structure, a target and electrical means for scanning the target to produce an intensified image; combined with a means of viewing or recording said image.

The features of this invention which are believed to be novel are set forth with particularity in the appended claims. The invention itself, however, together with further objects and advantages thereof, may best be understood by reference to the following specification taken in conjunction with the accompanying drawings which are appended. It is to be understood also that alternative concepts of construction may be devised by those familiar with the art and that the specific details appended and described are not to be considered as comprising the sole intent of concept. Other concepts of the preferred embodiment may also become evident to those skilled in the electronic art. It is planned for example to apply the novel photo-cathode with a scanning system of the Farnsworth type.

It is proposed in this invention to provide photosensitive screen surfaces which will be matched to each other in spectral intensity. It is also proposed to provide a target which will have a long storage time characteristic. It is further proposed to employ electron-optic means of electron acceleration and scansion of the target and an additional target for the return aspect of the electron beam comprising an electron multiplier.

Figure 1:
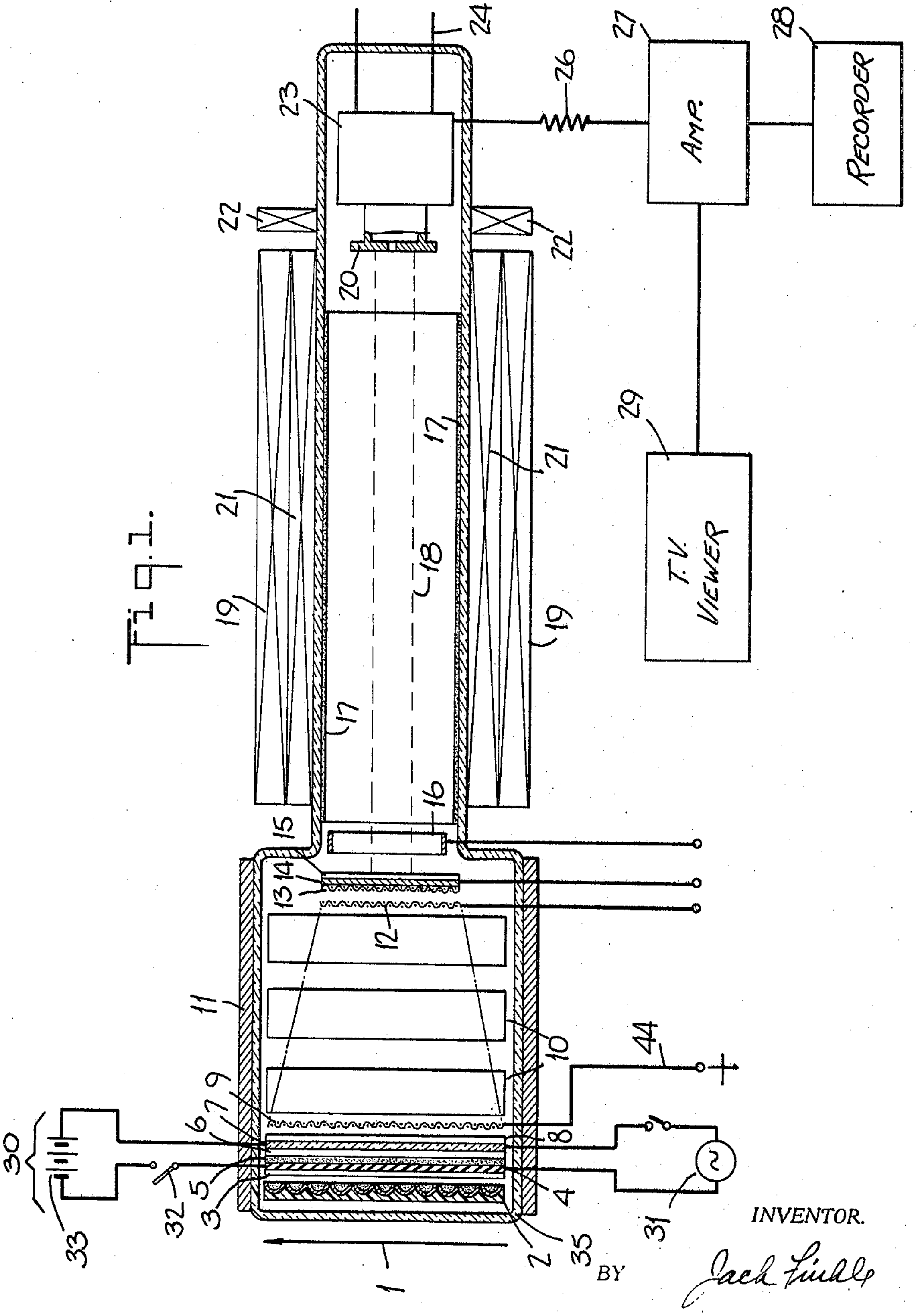

It is also propsed to employ in this invention image intensifier or amplifier structures as is known in the art. The use of such structures is well known for image intensification since they do not depend upon the intensity of the original input radiation but upon an outside source of independently applied voltage potential for light amplification. The original X-ray image mosaic on the other hand serves as the initiation source of activation of the structure. A typical image intensification structure is shown in FIG. 1 at 30 and consists of either a source of A.C. current 31 or a D.C. potential current 33 applied either singly or in combination to the input leads of the structure. The operation of such image intensifier units is well known in the art and thus need not be discussed here. Such an unit sensitive to X-rays for example can be constructed employing special boundary layers of crystalline nature which will emit light upon activation by the input X-ray. (See Orthuber et al., "A Solid State Image Intensifier," Jour. of the Optic. Soc. of Amer., vol. 44, 4, April 1954, pp. 297–99. Also, see Payne, E. C. et al., "Electro-Luminescence—A New Method of Producing Light," Illuminating Eng., November 1950, pp. 688–693.) Also see Patent 2,523,132, issued Sept. 19, 1950, to Coltman and Mason. See too, "Fluoroscopic Image Brightening by Electronic Means." Radiology, vol. 51, September 1948, pp. 359–366.

The intensifier unit 30 of the present invention in its fundamental aspects is conventional. It consists essentially of a composite flat screen or sandwich having a layer of electroluminescent material 6 and a layer of photoconductive material 5 sandwiched in between two conducting plates 4 and 7. The latter may consist of light-transparent thin films which are conductive. It is possible to include an opaque layer between the photo-conductive layer 5 and the electroluminescent layer 6 as a barrier layer to prevent light feedback and insure proper activation of the structure by the X-ray mosaic beam. The opaque layer 39 will be opaque to light but radiation-transparent to X-rays or ionizing radiation. The electroluminescent material and the photo-conductive material constitute a voltage divider between the said two electrodes and since the photoconductive material in its dark state is characterized by high resistance, the major portion of the potential between the two electrodes is applied thereacross and consequently the potential applied across the electroluminescent materail is low. If, however, the photoconductive material is subjected to light, its resistance is lowered with the consequence that the potential across the electroluminescent material rises to the point where under the influence of such raised potential it is caused to glow. In this invention the activation of the image intensifier unit 30 is a double one. The unit is activated by both the light emission from the X-ray sensitive photocathode structure 2 and the primary X-ray mosaic beam (which traverses the photocathode and the intensifier structure). The arrow 1 represents the object image of the X-ray mosaic beam. It is understood that source of X-ray [which is not shown] is used to produce this mosaic image. The X-rays after traversing the tube 35 strike the special type photocathode structure 2 and produce fluorescence in its component phosphor crystals. This fluorescence is made to be of high actinic value for activation of the image intensifier structure layer 5 which is made sensitive to such type of radiation. In the design of the various layers of the two structures, the photocathode and the image intensifier, the phosphors that are chosen are each chosen for high light output. The light output of the image intensifier structure 30 in FIG. 1 is utilized thereupon to activate and cause to be emitted from the surface of electrode 9 a great amount of photoelectrons greater than unity. These are then caused to be speeded up and made to strike a target surface 13 of the target 34. The target is thereupon scanned by an electron beam 18 from an electron gun 20 as is the usual custom.

Heretofore, images of objects were formed and projected on fluorescent screens, the resolution and definition of the image being limited by the optic emitting power of the substance comprising the screen. Various attempts have been made in the art to achieve better image definition and resolution without prolonging or increasing the time of exposure. In the medical art, the number of input quanta to the fluorescent screen is limited by the necessity of protecting the patient from injury by reason of excessive radiation. At the present state, the input radiation is already at its maximum limit. The radiation transmitted through an object is made up of a large number of individual bundles or quanta of energy. As each quantum hits the input fluorescent surface, it produces therefrom a brief scintillation of light depending on the nature of the phosphor substance composing its surface. Thus the resultant optical image is in fact formed from a large number of such scintillations per unit area per unit time. It is therefore a prime purpose of this invention to conserve the radiant energy emitted from the object under examination, to enhance to the maximum degree possible the number of light quanta emitted by the surface of the fluorescent screen layer. By doing so there is produced a substantial number of photoelectrons for electron-optic manipulation so that the final output image will be intensified with good definition without increasing the radiation dose to the object under study or observation.

In FIGURE 1 the tube face 35 is made of a composition glass of preferably low X-ray absorption and scattering effect, such as for example, a borosilicate lithium glass.

It is proposed to increase the light reflection of the input image that is made to fall upon the radiation-reactive surface of the photocathode 2. The photocathode carrier 2 in FIG. 1 is composed of layers previous to X-ray, having a plurality of immediately adjacent and evenly-spaced crenulated depressions of paraboloid shape on the rear surface facing the image intensifier structure 30, each depression being filled with a thin layer of silver or other similar metal such as platinum, nickel, aluminum, gold having a high reflective power as a mirror backing reflective coating, and serving to reflect light towards the image intensifier structure 30. Each depression has deposited within it and upon said reflective coating, a luminescing material generating light when subjected to ionizing radiation (X-rays).

The luminescing material may be composed of a phosphor layer which will emit light of high actinic quality when struck by X-radiation. It is proposed to have this light represent a visible representation of the original X-ray mosaic image which is invisible and represented by the arrow FIGURE 1. The layer may also be composed of a phosphor compound of two or more phosphors with or without an activator as is known in the art. For example, the layer may be composed of calcium tungstate with a lead activator. Moon reported in 1948 that calcium tungstate (Sheelite CaWo4) was the most useful and efficient of the organic phosphors, emitting spectra of a mean wavelength of 4300 angstroms. R. C. Mason employed in his invention a phosphor known as Patterson 1101 composed of silver activated zinc sulphide which emits light in a narrow band in the blue, near ultraviolet end of the ray spectrum. G. Destriau patented a screen made up of zinc sulfide and zinc cadmium sulfide, activated by manganese or by a mixture of manganese and silver, combined in various ratios which is sensitive to X-radiation. Of course, other similar type phosphors may be used such as barium platino-cyanide, magnesium tungstate activated by manganese, zinc beryllium silicate, zinc sulfide, barium lead sulphate, and copper activated phosphors. A halogen may be utilized with the phosphor also for higher emission yield. The R.C.A. Company of Camden, N.J., has a screen phosphor known as 332604B composed of zinc cadmium sulphide which gives good results.

The same film also puts out a phosphor known as P–11 which is characterized by unusually high image brightness and blue fluorescence. Other similar suitable combinations of the silicates and sulphides may be employed to good advantage.

Several patents exist which claim an improvement in the luminescent properties of calcium tungstate for excitation by X-rays by the incorporation of a small quantity of lead tungstate. (See British Patents 485,329 and 485,875 of A. H. McHoag; French Patent 820,886, and Patent 526,675 of Great Britain. Also see, 2,132,273 and 2,312,267 of the U.S., by W. A. Roberts.)

The advantage of employing a crenulated surface for increased light emission over a smooth coated surface is well-known in optics. For example, in photography it is a well-known fact that a beaded screen or indented screen having a coating within the indentations gives a better reflective projection of light than a smooth coated surface. By employing a metallic film as a backing, the light reflection is enhanced and the film also acts as a light mirror. In X-ray radiography, a film is placed in a carrier known as a cassette. This is composed of a sandwich of two intensifying screens coated with calcium tungstate between which is then placed an ordinary photographic film. While the coating of the film, being a silver coating in colloidal form is sensitive to X-radiation, the fact remains that the image formed on the film is due mainly to the light or fluorescence of the calcium tungstate crystal layer of the two intensifying screens. I have for these reasons decided to employ a photocathode with a crenulated surface 2 in combination with an image intensifier structure 30 rather than employing an image intensifier for image intensification alone. The image intensifier structure layers will be activated by *both* the light emission from the photocathode 2 as well as by the X-radiation passing through its layers toward the target 34.

It is also an object of this invention to obtain high intensity luminescent images from radiant energy irradiated luminescent solid materials contained in a solid state light amplifier through the phenomenon of "photo-electroluminescence." The phenomenon may be described as that property of certain phosphors which imparts to them the ability to exhibit, under the concurrent stimulation of incident radiation and a transversely impressed electric field, applied by electrodes in direct contact with opposite surfaces of a phosphor layer so that "charge transport" may occur therethrough, light emission from the luminescent phosphor layer which is of greater intensity and contains greater energy than the controlling radiation. The image intensifier structure 30 is a typical image intensifier of the solid-state type with a dielectric layer 5, a luminescent phosphor layer 6, two conducting electrode layers 4 and 7, and a source of input actuating voltage 31 or 33. The structure is actuated simultaneously with the X-ray machine from which the object image 1 is formed.

The electron-emissive and photoelectric anode structure 9 emits photoelectrons when struck by light from the phosphor layer 6. These are speeded up and travel to the target 34 for scanning by the electron gun. For X-radiation as input, and where the phosphor layer 6 is about 100 microns thick, it is suggested that a field force of about 600 volts A.C. to about 1000 volts A.C. of 800 cycle frequency be applied at 31.

The conducting electrodes 4 and 7 may comprise an easily volatizing metal, as for example, aluminum, silver or gold in thin films.

In a preferred construction of a laminated cell amplifier of the solid state type, the laminae are arranged in close proximity to each other in parallel plate arrangement by deposition on a base plate 3 to act as a condenser; a condenser having a dielectric between. The dielectric layer 5 may comprise any suitable dielectric which has a high dielectric constant, is transmissive to either visible light or X-rays, and such suitable dielectric materials are known in the art. The preferred method of manufacture of the intensifier is by the vapor reaction technique described by Cusano and Studer in U.S. Patent 2,685,530.

By choosing a photoelectric surface for the electron-emissive anode 9 which has its sensitivity in a very narrow bandwidth, we are able to match its spectral sensitivity to that of the input photosensitive phosphor screen surface. It is thus preferable that we choose a phosphor material to combine with in the image intensifier layer 6 which will emit light in this relatively narrow bandwidth. The extent and position of this band on an energy scale should be the minimum compatible with reasonable efficiency and maximum output.

In the design of this invention, I propose to employ in the image intensifier structure 30 suitable photosensitive phosphor surface elements which when struck by incident radiation, will emit light in the blue, near ultra-violet end of the ray spectrum. In turn, I also propose to employ as an output surface photoelectric layer of the photoelectric anode 9 substances which will have a threshold of emission near the center of the visible spectrum (6,000 angstroms) and which usually have their maximum response in the blue ultraviolet portion of the ray spectrum. There may be additional response to light of higher frequencies. For example, for the photoelectric surface of electrode 9, it has been found that surfaces produced by flashing caesium on arsenic, bismuth, or antimony, or any mixture of the latter and heating the product is satisfactory. The amount of heat employed ranges between 150 and 210 degrees centigrade and the flashing technic takes place in a vacuum. The frequency band of emission of the phosphor layer 6 of the intensifier structure 30 is such that the photon energy is somewhat greater than the energy binding the electrons of the photo-electric surface to the atoms. Thus, a substantial portion of the photons that are emitted by the fluorescent phosphor layer when struck by X-rays will cause in turn the ejection of a substantial number of photoelectrons from the photoelectric surface of 9.

By designing an image intensifier and photoelectric anode electrode with the above matched requirements, the X-ray energy is conserved, flickering is avoided, and electron optical aberration is minimized. Further, background noise of the emitted electron image will be low since the thermal emission of the photoelectric surface at 9 will be low. As the emission of electrons conforms to the initial image, the quality and definition of the final image is enhanced. I also provide a high impressed alternating current voltage of high frequency across the various layers of the intensifier, so as to provide a capacitator surge release of photoelectrons to the photoelectric surface. This voltage induced surge of light, provides a greater light output than can be provided by the X-radiation beam of 1 acting upon the surface elements alone.

The intensity of the light emitted will be a function of the input energy, the phosphor make-up of the material composing the fluorescing layer, and the applied electrical energy to the structure of the intensifier. Also, the close apposition of the fluorescent layer and the photoelectric layer surfaces serves to afford further enhancement of definition and prevent light loss.

In choosing a suitable fluorescing phosphor surface for the image intensifier it might be mentioned that G. Destriau patented a screen made up of zinc sulphide and zinc cadmium sulphide, activated by manganese or by a mixture of manganese and silver, combined in various ratios which is sensitive to X-radiation energies, U.S. Patents 2,885,558 and 2,855,600. The phosphor material exhibiting the phenomenon of photo-electroluminescence must in order to have a charge transport occur through the phosphor crystal satisfy a special requirement, namely that there be a continuity of electrical properties throughout the phosphor layer. In other words, the phosphor matrix must be composed entirely of phosphor material in orderly crystalline array with no interstices. The phosphor layers must be homogenous, continuous, crystalline and non-granular and must exhibit uniform electrical properties throughout. It has been found that the combination of a doubly-activated phosphor, i.e., one mixed with two or more activators, that the emission intensity at high voltage intensities is from two to three times brighter than the emission of a singly activated phosphor system installed alone. Suitable activators are silver, manganese, lead sulfide, lead tungstate, arsenic, phosphorus, or antimony. A halogen may also be included with the activators for still higher emission yields such as iodine.

The usual type of electroluminescent image intensifiers are designed for operation only with an alternating or A.C. applied voltage potential. Where similar devices have been designed to be operable on D.C. potential to produce light emission, the so-called D.C. electroluminescence has been poor when compared to that of A.C. applied types. One drawback in A.C. applied electroluminescent devices, is that the decay time of the photo-conductor layer is quite slow being of the order of 1 to 10 seconds. Also the decay time of each light flash for the usual electroluminescent phosphor is in the order of about 60 microseconds, where a frequency greater than 20 cycles per second is applied, the eye blends together the resultant alternate flashes to produce a continuous light effect. As the frequency of excitation applied is increased, however, the electroluminescent phosphor decay time of approximately 60 microseconds limits the applied frequency which can be detected by the electroluminescent device. Therefore, to obtain an increased light output, it is preferable that a combination of both high D.C. and A.C. applied potential of varying frequency be applied to the electroluminescent device as shown in FIGURE 1, and that the layer thicknesses of the image intensifier structure be designed with this end in mind.

In operating the device, it may also be useful to employ the method of presensitization of the phosphor layer by turning on the X-ray machine for a short period of time as explained in U.S. Patents 2,885,558, 2,885,559 and 2,885,560 issued to G. Destraiu, May 28, 1954. He claimed that by presensitization, the screen brightness is increased by a factor of 12.4 to 1. For instance, in radiography, the technic for soft tissues is very different than that for thick tissues and bone technic. The operator increases the voltage and shortens the time element for thick tissue technic. The image intensifier may thus have the D.C. potential applied for a short time or together with the A.C. potential for a short time at a high frequency. For longer periods of operation of the X-ray unit, say with low voltage k.v.p. and high current technic, the image intensifier structure can be likewise activated for long periods with a high A.C. potential and a high frequency as long as necessary or in conjunction with a high D.C. voltage of equally high frequency.

The employment of a long delay between presensitization and the actual image formation may not be good.

The electrons leaving the image intensifier are photoelectrons. These produce a corresponding electronic image mosaic from the photoelectric anode 9. The electrons leaving the photoelectric surface are speeded up towards the target 34 by means of suitable electromagnetic lenses 10 and 11. Next the electron image is stored in the special storage target 34 which has a special storage layer of long time delay coated upon its surface at 13. The storage of the electron image at the storage target allows inspection of the X-ray image for a desired time without the need of maintaining X-ray beam forming current at 1. Thus we have a write-in period and a read-out period as is customary in the electronic art. The photoelectron image is deposited as a charge pattern on the surface of the target facing the photocathode and image intensifier structures. The target structure is well-known in the art and may be of the barrier layer type (orthicon) or the dielectric island type. A field equalizing grid is employed in front of the dielectric islands at 12. In this invention the latter type is preferable. Fundamentally, we have a high velocity beam of electrons striking one side of the target and a low velocity stream of electrons striking the opposite side. Repeated scanning of the rear surface of the target at 15 by the electron gun supplied electrons, 18 will produce reinforcement of the final image for repeated viewing if necessary. In the dielectric island type target, a degree of control over the charge present on the dielectric is obtained by varying the potential of the target structure. The current flow may be detected by obtaining variations in current flow received at a collector electrode or by variations being received due to the secondary electron current at the target structure itself. The electron beam from the C.R. gun is modulated in the orthicon type by the stored charges on the target and the return beam is reflected to a dynode grid electrode assembly causing the emission of secondary electrons therefrom which are collected by the multiplier unit 23 and subsequently further amplified. Alignment and deflection of the beam is accomplished by transverse magnetic fields produced by external deflecting coils 19, 21 and 22 and an aquadag coating on the inner surface of the tube at 17. The electron beam that scans the target is made preferably slow for better effect. The increased multiplication results from the return aspect of the scanning beam striking additional dynode plates in the multiplier section 23. This is more fully shown in FIGURE 3. This section amplifies the modulated beam by about 500 times and permits use of a video amplifier with fewer stages. The intelligence signal may be further amplified by hi-mu tubes and fed to a TV viewer at 29 or a recorder device at 28. It is also quite possible to feed the intelligence signal to a supplementary storage tube for future viewing. Suitable storage type tubes useful as an adjunct to this invention are those described in patents of Sheldon, 2,894,159; 2,817,781 of Henderson, 2,875,372; modified tubes of Young, 2,875,370; Sziklai, 2,573,777; and the type 7448 Display tube of R.C.A. This arrangement allows shutting off of the X-ray machine and initial irradiation to the patient while reading the X-ray image picture on the viewing screen. This saves the patient from receiving an excessive harmful dose of ionizing radiation. In employing a TV pick-up system, an amplified image will be produced on the kinescope output screen which will be a replica of the distribution of the original X-ray produced electron image.

The basis for the present invention is the photoemissive effect, which is the effect whereby a photon striking a layer of conducting material—the photocathode—causes the ejection of a free electron from it. The photoemissive effect is well suited to the preservation of an image by the employment of an image intensifier structure because of the existence and employment of electron lenses. These are suitably shaped electric fields, or combinations of electric and magnetic fields, which not only accelerate the photoelectrons, so giving them sufficient energy to make their detection easier, but at the same time to control their trajectories so that the original spacial relationship is restored in an electron image. The X-ray beam photons in striking the novel-type photocathode structure surface 2 causes the emission of similar photoelectrons.

A positive-going bias is applied to the photo-electric anode 9 to create an Edison effect or space charge at the surface of the anode so as to facilitate the release of photoelectrons from its surface towards the target 34.

Figure 2:
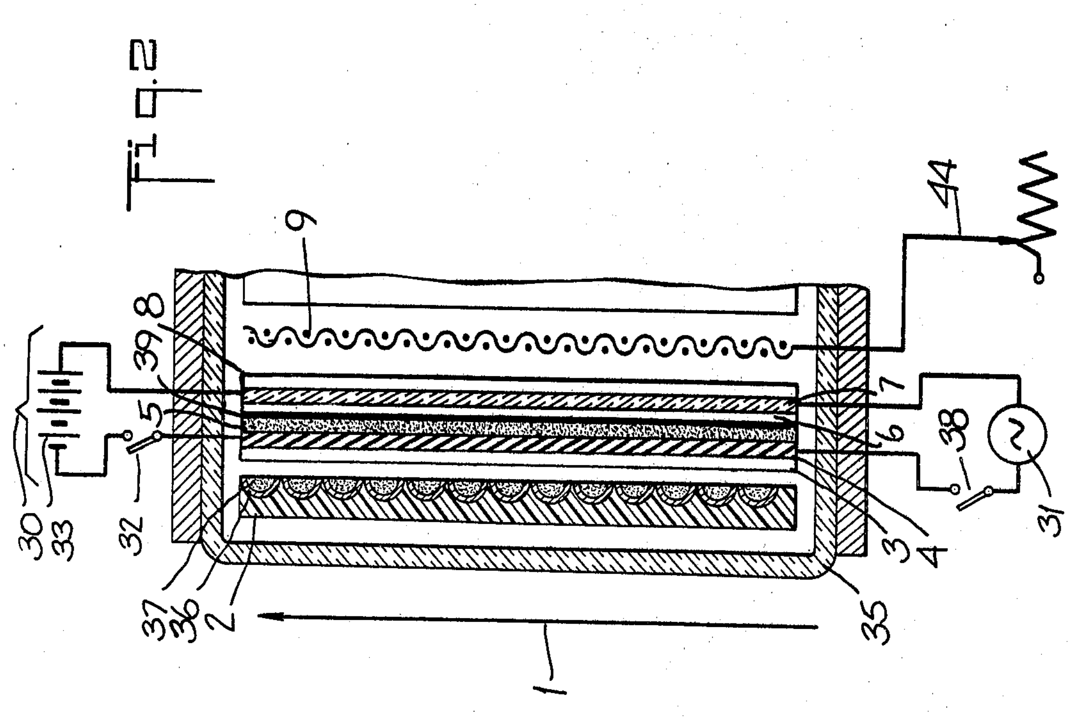
FIGURE 2 is a fragmentary schematic illustration in cross-section of the presently preferred embodiment of the invention showing the details of the radiant energy responsive photocathode and intensifier target.

FIGURE 2 illustrates a schematic breakdown of the forward section of the invention. A source of ionizing radiation exterior to the tube and not shown produces a mosaic image representative of the object being X-rayed at the face of the tube 35. The arrow FIGURE 1 represents this image in the form of invisible radiation and in the case of X-rays serves to activate the novel photocathode structure 2. The rays pass through the base of element 2 and also through metal film coating 36 and strike the layer 37 deposited in the depressions on the rear surface of 2 thereby causing a fluorescence to be emitted from the phosphor crystals of this layer. The fluorescence is reflected by the metal film mirror layer 36 to the first layer of the image intensifier structure 30. The photoelectrons which emitted by structure 2 then activates the image intensifier unit after switches 32 and 38 are closed. A combined voltage source is utilized namely D.C. source 33 and A.C. source 31. The phosphor layer 6 is activated by the passage of the X-rays through said layer after passage through the conductor 4 which is transparent to light from the photocathode 2 and through dielectric layer 5. The voltage is a high voltage of high frequency in each instance. The D.C. voltage is supplied by a battery and may consist of 40 volts, while the A.C. potential may be 6 volts R.M.S. of 800 to 1000 c.p.s. across the units electrodes. The frequency of the A.C. potential may range between 15 cycles per sec. to 500 kilocycles per sec. A transformer and a capacitor in the exterior circuit may be used. The light emitted by the intensifier then passes to the surface of the photoelectric anode structure 9 and serves to cause photoelectrons to be emitted from its surface. This anode may be in the form of a mesh or be foraminated in its construction. A positive-going voltage may be applied to its input lead 44. The photoelectric anode has a coating of the caesium-antimony type compound preferably but may consist of any mixture of bismuth, arsenic, rubidium, etc. It is applied by methods known in the art. A base coat of caesium oxide with some free caesium in it also may be used. The luminescence of the image intensifier unit is known as photoelectroluminescence and the image is intensified by the process.

In layer 6 has deposited upon it an extra layer 39 which may be a suitable light-transparent layer of dielectric material such as Nesa. This layer may be omitted but it is preferable that it be included as it serves as barrier to chemical interaction between the light-emitting phosphor layer 6 and the conductor layer 7. If the layer is made too thick there is a tendency for its light-transparency to be affected. It may be also advantageous to employ the phosphor layer 6 in a suitable plastic matrix. This method is known in the art.

The novelty of this invention lies first in the unique combination of elements utilized, the arrangement of the component parts, and in the choice of materials used. In my copending application filed Sept. 1, 1961, the choice of materials is more fully discussed.

If it is desired to omit or dispense with the photo cathode unit entirely, then barrier layer 39 should be made opaque. This serves to prevent light spreading over the surface of the image intensifier phosphor layer once light production is initiated. The structure will nevertheless be activated by the input ionizing radiation at each point over its layers' surfaces. Thus an intensified image likewise will be produced for photoelectron emission at anode structure 9.

Figure 3:
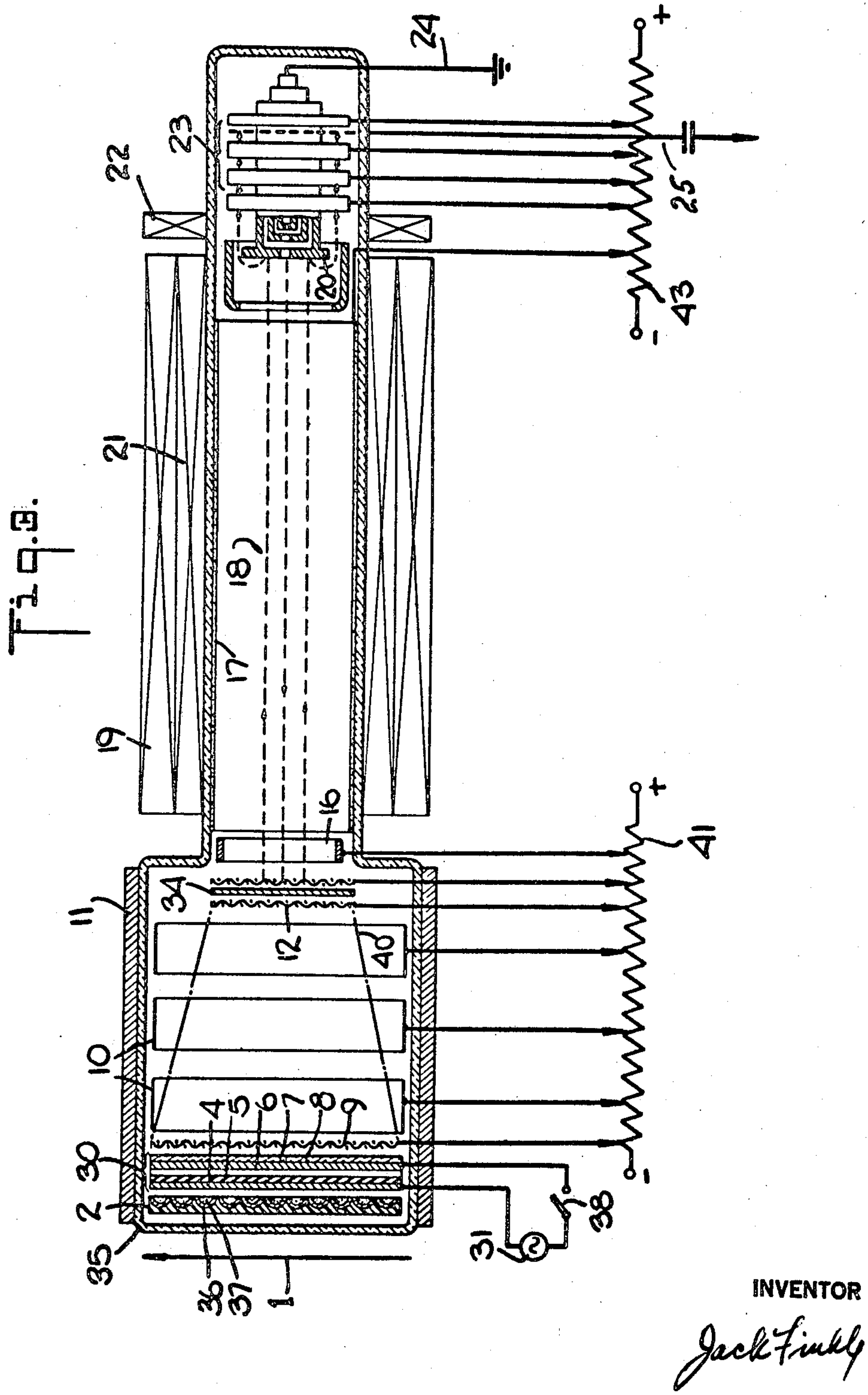
FIGURE 3 is a view similar to FIGURE 1 and shows a second modification with the image intensifier structure of FIGURE 1 but using only A.C. voltage potential as the activating force to said intensifier structure.

FIGURE 3 represents a modification of tube 1 and serves to show the way the electron image from anode 9 is focussed and concentrated and speeded up towards target 34 by the electromagnet lenses or anodes 10 and 11. Also, the electron-gun structure and the accompanying electron-multiplier structure 23 are shown in fuller detail. It is not necessary to discuss this figure in detail as the section from the target 34 to the tube end is known in the art. Operation of the tube in FIGURE 3 is similar to that in FIGURE 1 except only an A.C. voltage of high potential and high frequency is applied to the image intensifier input leads.

This invention provides, therefore, an improved electronic image reproducer tube for viewing images produced by ionizing radiation. While I have shown my invention in one form, it will become evident to those skilled in the art that it is not so limited, but is also susceptible of various other changes and modifications without departing from the spirit and scope thereof.

I claim as my invention:

1. An image transducer responsive to X-rays, comprising:

an evacuated envelope having an entrance end transparent to incident X-rays;

a receiving unit in said envelope disposed adjacent said entrance end for irradiation by said X-rays, said unit having a radiation-permeable base with a crenulated surface remote from said entrance end forming a multiplicity of depressions of substantially paraboloidal shape, a light-reflecting layer on said crenulated surface lining said depressions, and a fluorescent mass excitable by said X-rays filling said depressions to produce concentrated bundles of light rays generally paralleling the exciting X-rays;

an image-intensifier structure in said envelope confronting said crenulated surface for receiving said light rays therefrom together with X-rays transluminating said unit, said structure including an emissive layer for producing, in response to said X-rays and light rays, an electron beam conforming to the intensity pattern of the incident X-rays;

and output means in said envelope for converting said electron beam into a visible picture.

2. An image transducer as defined in claim 1 wherein said output means comprises a target for storing energy of said electron beam and beam-generating means for periodically scanning said target.

3. An image transducer as defined in claim 1 wherein said structure comprises a photoconductive layer proximal to said unit, and an electroluminescent layer interposed between said emissive layer and said photoconductive layer for joint excitation by an electric field emanating from the latter and by penetrating X-rays from said entrance end.

4. An image transducer as defined in claim 3 wherein said structure further comprises a barrier layer opaque to said light rays but transparent to said X-rays between said photoconductive and electroluminescent layers.

5. An image transducer as defined in claim 3 wherein said structure further comprises a pair of conductive layers bracketing said photoconductive and electroluminescent layers, and a source of voltage connected across said conductive layers.

References Cited

UNITED STATES PATENTS

| | | | |
|---|---|---|---|
| 2,550,316 | 4/1951 | Wilder | 178—6.8 |
| 2,555,545 | 6/1951 | Hunter | 313—65 |
| 2,804,560 | 8/1957 | Sheldon | 313—65 |
| 3,002,101 | 9/1961 | Anderson | 250—213 |
| 3,054,900 | 9/1962 | Orthuber | 313—101 |
| 3,089,956 | 5/1963 | Harper | 250—213 |

ROBERT L. GRIFFIN, Primary Examiner

JOSEPH A. ORSINO, Jr., Assistant Examiner

U.S. Cl. X.R.

178—6.8; 313—65, 101